United States Patent
Mutsuda et al.

(10) Patent No.: US 8,926,912 B2
(45) Date of Patent: *Jan. 6, 2015

(54) EXHAUST GAS PROCESSING DEVICE

(75) Inventors: Fumiyuki Mutsuda, Gifu (JP); Yoshitaka Fujita, Gifu (JP)

(73) Assignee: Ibiden Co., Ltd., Ogaki-shi (JP)

(*) Notice: Subject to any disclaimer, the term of this patent is extended or adjusted under 35 U.S.C. 154(b) by 293 days.

This patent is subject to a terminal disclaimer.

(21) Appl. No.: 13/282,527

(22) Filed: Oct. 27, 2011

(65) Prior Publication Data
US 2012/0177540 A1 Jul. 12, 2012

(30) Foreign Application Priority Data
Jan. 6, 2011 (WO) .................. PCT/JP2011/050094

(51) Int. Cl.
*B01D 50/00* (2006.01)

(52) U.S. Cl.
USPC ............................. 422/179; 422/180; 422/174

(58) Field of Classification Search
USPC ......................................... 422/174, 179, 180
See application file for complete search history.

(56) References Cited

U.S. PATENT DOCUMENTS

| | | | |
|---|---|---|---|
| 5,588,292 A * | 12/1996 | Hiraishi et al. | 60/300 |
| 6,166,358 A | 12/2000 | Abe | |
| 2004/0177609 A1 * | 9/2004 | Moore et al. | 60/323 |
| 2006/0292342 A1 * | 12/2006 | Ohno et al. | 428/116 |
| 2007/0178275 A1 | 8/2007 | Takahashi | |
| 2009/0041638 A1 * | 2/2009 | Tomosue et al. | 422/180 |
| 2009/0060800 A1 * | 3/2009 | Fernandes, Jr. | 422/168 |
| 2010/0308849 A1 * | 12/2010 | Bouteiller et al. | 324/700 |
| 2012/0076699 A1 * | 3/2012 | Ishihara | 422/174 |
| 2013/0022513 A1 * | 1/2013 | Yoshioka et al. | 422/174 |
| 2013/0200060 A1 * | 8/2013 | Yoshioka et al. | 219/201 |

FOREIGN PATENT DOCUMENTS

| | | |
|---|---|---|
| DE | 3938657 | 5/1990 |
| DE | 102005019182 A1 * | 10/2006 |
| EP | 2096348 | 9/2009 |
| EP | 2210920 | 7/2010 |
| JP | 49-124412 U | 10/1974 |
| JP | 05-187223 | 7/1993 |
| JP | 11-093649 | 4/1999 |
| JP | 2010-229976 | 10/2010 |

OTHER PUBLICATIONS

Extended European Search Report for corresponding EP Application No. 11183474.3-2321, Jan. 12, 2012.
Jona et al., "Characterization of Pore Structure of Filter Media", Fluid/Particle Separation Journal vol. 14, No. 3, p. 227 to 241.

* cited by examiner

*Primary Examiner* — Tom Duong
(74) *Attorney, Agent, or Firm* — Mori & Ward, LLP

(57) ABSTRACT

An exhaust gas processing device includes a honeycomb structure in a pillar shape including a honeycomb unit, a catalytic agent, an inorganic mat member, a cylindrical metallic member and an insulating layer. The honeycomb unit includes cell walls to define a plurality of cells which extend from a first end of the honeycomb unit to a second end of the honeycomb unit along a longitudinal direction. The catalytic agent is provided on the cell walls. The inorganic mat member is wound around an outer peripheral surface of the honeycomb structure. The cylindrical metallic member accommodates the honeycomb structure around which the inorganic mat member is wound. The insulating layer has a thickness of about 20 μm to about 400 μm and is densely formed. The insulating layer is provided between an inner surface of the cylindrical metallic member and the inorganic mat member.

28 Claims, 9 Drawing Sheets

US 8,926,912 B2

EXHAUST GAS PROCESSING DEVICE

CROSS-REFERENCE TO RELATED APPLICATIONS

The present application claims priority under 35 U.S.C. §119 to International application No. PCT/JP2011/050094, filed in Japan on Jan. 6, 2011, the entire contents of which are incorporated herein by reference.

BACKGROUND OF THE INVENTION

1. Field of the Invention

The present invention relates to an exhaust gas processing device.

2. Discussion of the Background

Many technologies are developed for purification (conversion) of an exhaust gas emitted from automobiles. However, increasing traffic is making countermeasures for the exhaust gas insufficient. On a global mass scale, automobile exhaust gas regulations are becoming strict.

In order to deal with the automobile exhaust gas regulations, catalytic agent carriers capable of processing predetermined toxic substances contained in the exhaust gas are used in an exhaust gas treatment system. A honeycomb structure is known as a member for the catalytic agent carrier.

The honeycomb structure includes plural cells (through holes) extending from one end surface of the honeycomb structure to the other end surface of the honeycomb structure in its longitudinal direction. The cells are formed in a honeycomb unit mutually separated by cell walls and carrying the catalytic agents. Therefore, if the exhaust gas passes through the honeycomb structure, the catalytic agent carried on the cell wall may convert (oxidize or reduce) materials such as a hydrocarbon compound (HC), carbon monoxide (CO), nitrogen oxide (NOx) and so on contained in the exhaust gas to treat the components in the exhaust gas.

The cell wall (base material) of the honeycomb unit forming the above honeycomb structure may be made of cordierite. A catalytic agent carrying layer made of γ-alumina is formed on the cell wall. A noble metal catalytic agent such as platinum, rhodium, platinum and rhodium, and so on is carried on the catalytic agent carrying layer.

Further, a honeycomb unit made of a material having a lower electrical resistivity such as silicon carbide than that of cordierite may be used in order to enhance an exhaust gas processing capability at a temperature lower than a temperature causing the catalytic agent to be active. An electrode for applying a voltage is provided in the honeycomb structure and electric power is applied to the honeycomb structure to heat the honeycomb structure according to Japanese Utility Model Application Publication No. 49-124412.

The entire contents of which Japanese Utility Model Application Publication No. 49-124412 are incorporated herein by reference.

SUMMARY OF THE INVENTION

According to one aspect of the present invention, an exhaust gas processing device includes a honeycomb structure in a pillar shape including a honeycomb unit, a catalytic agent, an inorganic mat member, a cylindrical metallic member, and an insulating layer. The honeycomb unit includes cell walls extending along a longitudinal direction of the honeycomb unit to define a plurality of cells which extend from a first end of the honeycomb unit to a second end of the honeycomb unit along the longitudinal direction. The catalytic agent is provided on the cell walls. The inorganic mat member is wound around an outer peripheral surface of the honeycomb structure. The cylindrical metallic member accommodates the honeycomb structure around which the inorganic mat member is wound. The insulating layer has a thickness of about 20 μm to about 400 μm and is densely formed. The insulating layer is provided between an inner surface of the cylindrical metallic member and the inorganic mat member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
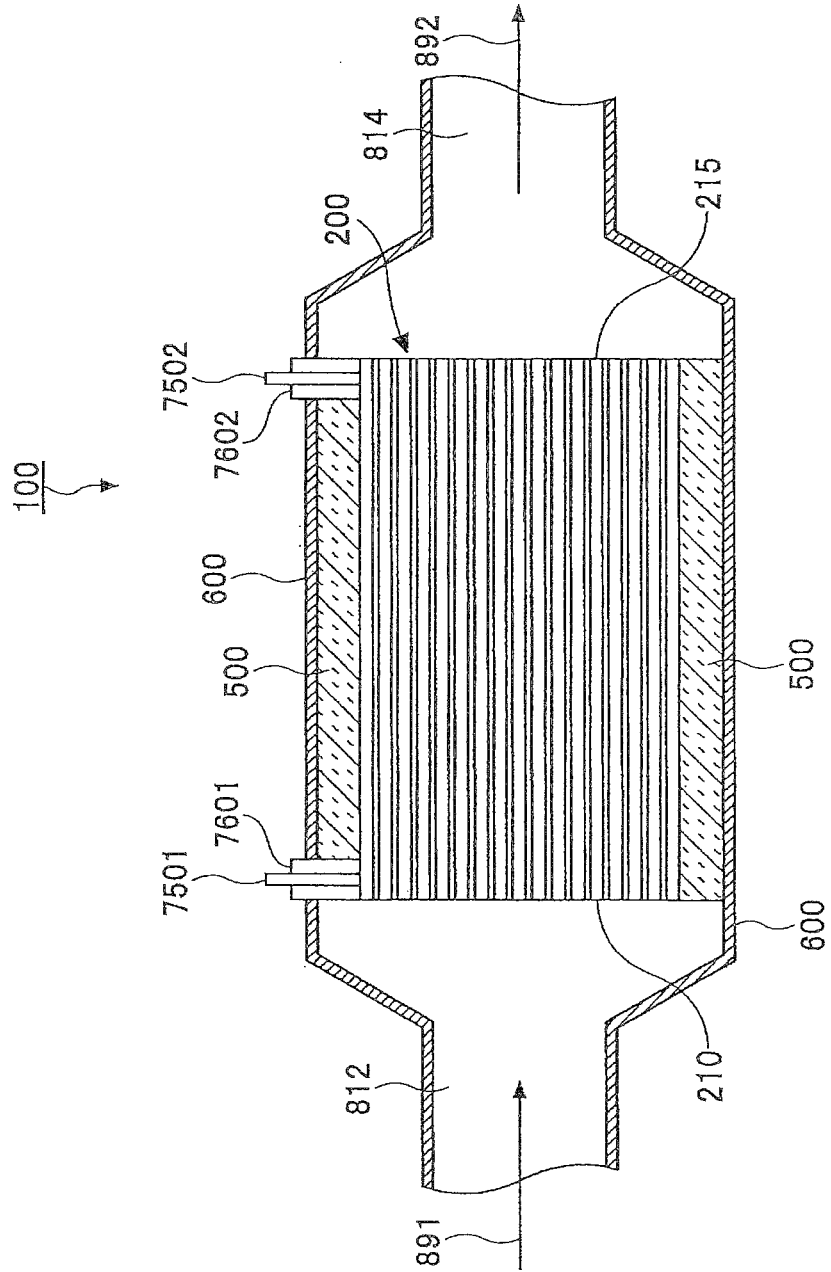
FIG. 1 is a cross-sectional view schematically illustrating an exhaust gas processing device of an embodiment of the present invention.

This conventional honeycomb structure disclosed in Japanese Utility Model Application Publication No. 49-124412 is heated with its resistance after applying electricity to the honeycomb structure via the electrodes. If the exhaust gas processing device is formed by the honeycomb structure, a mat member is wound around the outer periphery of the honeycomb structure and the honeycomb structure having the mat member wound around the honeycomb structure is accommodated in a metallic cylindrical member.

The mat member is assumed to get insulation properties with its high electric resistance under a dried atmosphere at a room temperature (for example, 25° C.). However, if the mat member is impregnated with moisture under high humidity, the electric resistance may be decreased and the electric conductivity may be increased. Further, if the mat member is impregnated with moisture to increase the electric conductivity, there is a problem that the honeycomb structure and the metallic cylindrical member are electrically short-circuited and a current leaks to the metallic cylindrical member at a time of applying electricity to the honeycomb structure. If the electric current leaks to the metallic cylindrical member as described, the honeycomb structure becomes less apt to be sufficiently heated.

Embodiments of the present invention provide an exhaust gas processing device which is enable to prevent an electric current from flowing to parts other than the honeycomb structure when electricity is applied to the honeycomb structure.

The embodiments will now be described with reference to the accompanying drawings, wherein like reference numerals designate corresponding or identical elements throughout the various drawings.

Figure 2:
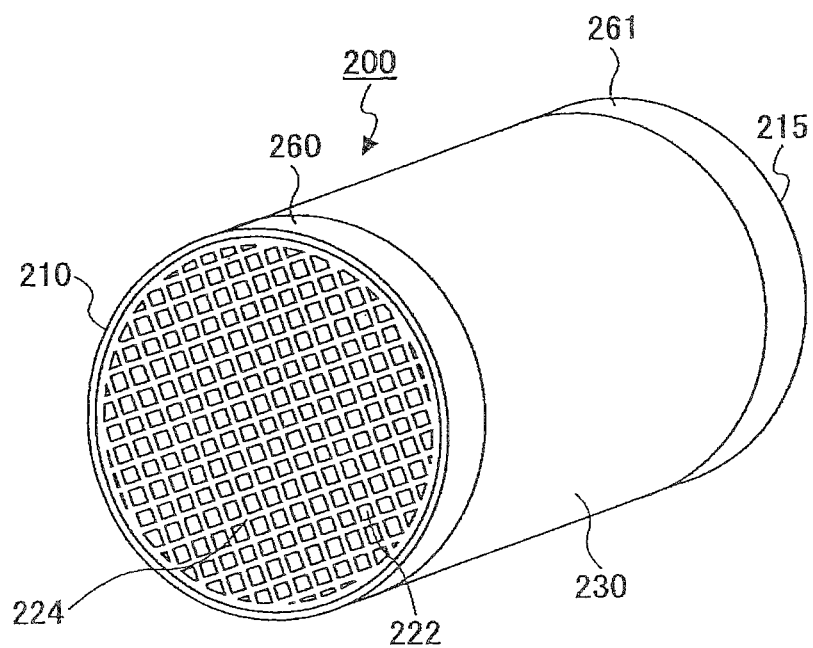
FIG. 2 is a perspective view schematically illustrating an example honeycomb structure included in the exhaust gas processing device of the embodiment of the present invention.

FIG. 1 schematically illustrates an exemplary exhaust gas processing device of an embodiment of the present invention. FIG. 2 schematically illustrates a honeycomb structure forming an exhaust gas processing device of the embodiment of the present invention.

Referring to FIG. 1, the exhaust gas processing device 100 according to the embodiment of the present invention includes a honeycomb structure 200, an inorganic mat member 500 wound around the outer peripheral surface of the honeycomb structure 200, and a cylindrical metallic member 600 accommodating the honeycomb structure 200 having the inorganic mat member 500 wound around the honeycomb structure 200. The honeycomb structure 200 has one honeycomb unit.

The inorganic mat member 500 is wound around the outer peripheral surface of the honeycomb structure 200. When the exhaust gas processing device 100 is actually used in a vehicle or the like, the honeycomb structure 200 is in contact with the cylindrical metallic member 600 to prevent the honeycomb structure 200 from being damaged by a contact between the honeycomb structure 200 and the cylindrical metallic member 600.

The cylindrical metallic member 600 has a function of accommodating the honeycomb structure 200 around which the inorganic mat member 500 is wound. The cylindrical metallic member 600 may be made of stainless steel, a nickel base alloy and so on.

Referring to FIG. 2 in detail, the honeycomb structure 200 has two end surfaces 210 and 215 which are opened. The honeycomb structure 200 includes plural cells (through holes) 222 extending from one end to the other end in its longitudinal direction and opened at the both end surfaces 210 and 215, and cell walls 224 for separating the cells 222. A catalytic agent is provided on the cell wall 224.

The honeycomb unit forming the honeycomb structure 200 is formed by a material whose main component is silicon carbide (SiC). In order to reduce the electric resistance of the honeycomb structure 200, a small amount of resistance adjusting component such as aluminum nitride (AlN) may be further added to the material of the honeycomb unit. The honeycomb unit forming the honeycomb structure 200 is electrically conductive.

A set of electrodes 260 and 261 are located on the outer peripheral surface 230 of the honeycomb structure 200. In the example exhaust gas processing device 200 illustrated in FIG. 2, the electrode 260 surrounds one end portion of the outer peripheral surface 230 of the honeycomb structure 200, and the electrode 261 surrounds the other end portion of the outer peripheral surface 230 of the honeycomb structure 200. The one and other end portions of the outer peripheral surface 230 are in ranges of about 50 mm or less from the end surfaces 210 and 215 of the honeycomb structure 200. However, this is only an example and the shape and location of the electrodes 260 and 261 are not specifically limited.

The electrodes 260 and 261 are made of an electric conductive material such as a metal. A method of forming the electrodes 260 and 261 is not specifically limited. The electrodes 260 and 261 may be formed on the outer peripheral surface 230 of the honeycomb structure 200 by thermal-spraying a metal, sputtering a metal, vapor-deposition of a metal, and so on.

Referring back to FIG. 1, the exhaust gas processing device 100 includes a pair of electric terminals 7501 and 7502. The electrode 7501 penetrates the inorganic mat member 500 and is connected to the electrode 260 provided in the honeycomb structure 200. The electrode 7502 penetrates the inorganic mat member 500 and is connected to the electrode 261 provided in the honeycomb structure 200. Said differently, the electric terminals 7501 and 7502 are electrically connected to the honeycomb structure 200 via the electrodes 260 and 261. The electrode terminals 7501 and 7502 are insulated from the cylindrical metallic member 600 via insulators 7601 and 7602.

Referring to an exhaust gas processing device 100 illustrated in FIG. 1, when an exhaust gas flows from an inlet 812 to an outlet 814 in the direction of an arrow 891, the exhaust gas flows into the honeycomb structure 200 from the end surface 210 of the honeycomb structure 200.

Electric potentials are previously applied to the electrodes 260 and 261 via the electric terminals 7501 and 7502. The electric potentials of the electrodes 260 and 261 are different. Therefore, the temperature of the honeycomb structure 200 is increased by resistance heating. Therefore, an exhaust gas flowing into the honeycomb structure 200 is treated while the catalytic agent existing on the cell wall of the honeycomb structure 200 is activated by heat generated by the resistance heating in the honeycomb structure 200. Even if the temperature of the exhaust gas is low like an exhaust gas of a hybrid car or the like, the activated catalytic agent properly can treat the exhaust gas. Thereafter, the treated exhaust gas is exhausted from the end surface 215 of the honeycomb structure 200 in the direction illustrated by an arrow 892.

As described, the exhaust gas can be apt to be treated by making the exhaust gas flow inside the honeycomb structure 200 with the exhaust gas processing device 100.

In the conventional exhaust gas processing device of Japanese Utility Model Application Publication No. 49-124412, the conductive honeycomb structure is insulated from the cylindrical metallic member by interposing the inorganic mat member between the conductive honeycomb structure and the cylindrical metallic member. The inorganic mat member has insulation properties with its high electric resistance under a dried atmosphere at a room temperature (for example, 25° C.). However, if the mat member is impregnated with moisture under high humidity, the electric resistance may be apt to be decreased and the electric conductivity may be increased. Therefore, if the inorganic mat member contains moisture while the exhaust gas processing device is used, the electric resistance of the inorganic mat member decreases and the insulating property between the honeycomb structure and the cylindrical metallic member may be degraded.

With this, there may be apt to occur a problem that the honeycomb structure and the cylindrical metallic member short-circuits thereby causing the electric current to leak to the cylindrical metallic member. If the electric current leaks to the metallic cylindrical member, the honeycomb structure is less apt to be sufficiently heated.

Meanwhile, the exhaust gas processing device 100 of the embodiments of the present invention has a feature that a densely formed insulating layer is formed at least at a position of the inner surface of the cylindrical metallic member 600 in contact with the inorganic mat member 500.

On an interface between the cylindrical metallic member 600 and the insulating layer, a material constituting the cylindrical metallic member 600 and a material constituting the insulating layer are chemically bonded to thereby improve adhesion between the cylindrical metallic member 600 and the insulating layer. Specifically, on an interface between the cylindrical metallic member 600 and the insulating layer, a material constituting the cylindrical metallic member 600 and a material constituting the insulating layer are chemically bonded to thereby improve adhesion between the cylindrical metallic member 600 and the insulating layer.

In the exhaust gas processing device 100, when an electric current is applied to the honeycomb unit included in the honeycomb structure 200, the temperature of the honeycomb structure 200 increases. By introducing the exhaust gas containing moisture into the exhaust gas processing device 100, the inorganic mat member 500 absorbs the moisture. However, in the exhaust gas processing device 100 of the embodiments of the present invention, even if the insulating property of the inorganic mat member 500 are degraded by the absorption of water in the inorganic mat member 500, the insulating layer existing on the inner surface of the cylindrical metallic member 600 enables ensuring a good insulating property between the honeycomb structure 200 and the cylindrical metallic member 600. For example, even if electricity is applied to the honeycomb structure 200 of the exhaust gas processing device 100 of the embodiment of the present invention, the resistance between the honeycomb structure 200 and the cylindrical metallic member 600 may be maintained to be about $1 \times 10^5 \Omega$ or more.

Thus, in the embodiments of the present invention, the current leak from the honeycomb structure 200 is significantly restricted and the honeycomb structure 200 can appropriately undergo the resistance heating.

(The Densely Formed Insulating Layer Provided on the Inner Surface of the Cylindrical Metallic Member 600)

Figure 3:
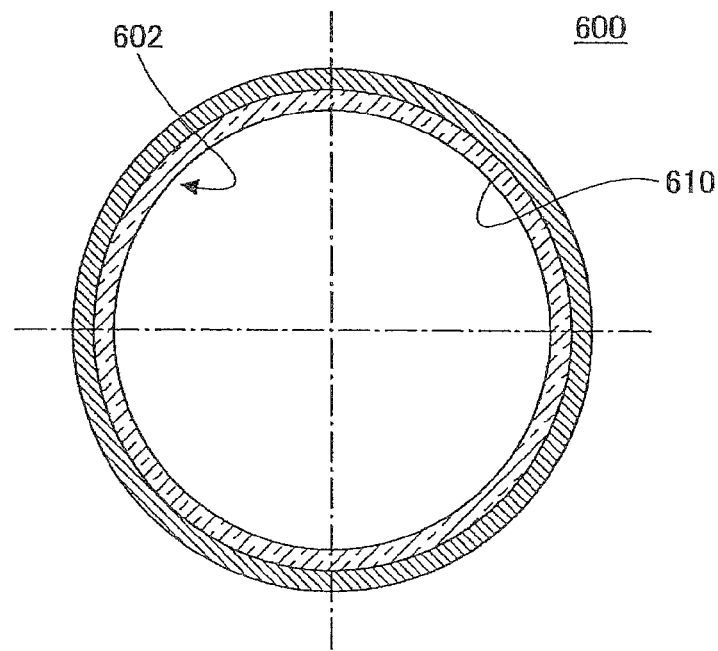
FIG. 3 is a cross-sectional view schematically illustrating an exemplary cylindrical metallic members included in the exhaust gas processing device of the embodiment of the present invention.

Referring to FIG. 3, the densely formed insulating layer provided on the inner surface of the cylindrical metallic member 600 is described in detail. FIG. 3 is a cross-sectional view schematically illustrating the exhaust gas processing device 600 of the embodiments of the present invention taken along the direction perpendicular to the longitudinal direction of the exhaust gas processing device 100.

Referring to FIG. 3, the cylindrical metallic member 600 has the inner surface 602, and insulating layer 610 is formed on the inner surface 602.

With the fineness of the densely formed insulating layer 610, no through pores exist in the thickness direction of the insulating layer 610. For example, the densely formed insulating layer includes an insulating layer having no pores at all, an insulating layer having only closed pores, and an insulating layer having blind pores clogged only on one side in the thickness direction of the insulating layer.

The through pore, the closed pore, and the blind pore are described in Characterization of Pore Structure of Filter Media (Fluid/Particle Separation Journal vol. 14, No. 3, p. 227 to 241). The entire contents of the blind pore are described in Characterization of Pore Structure of Filter Media (Fluid/Particle Separation Journal vol. 14, No. 3, p. 227 to 241) is incorporated herein by reference.

Figure 10:
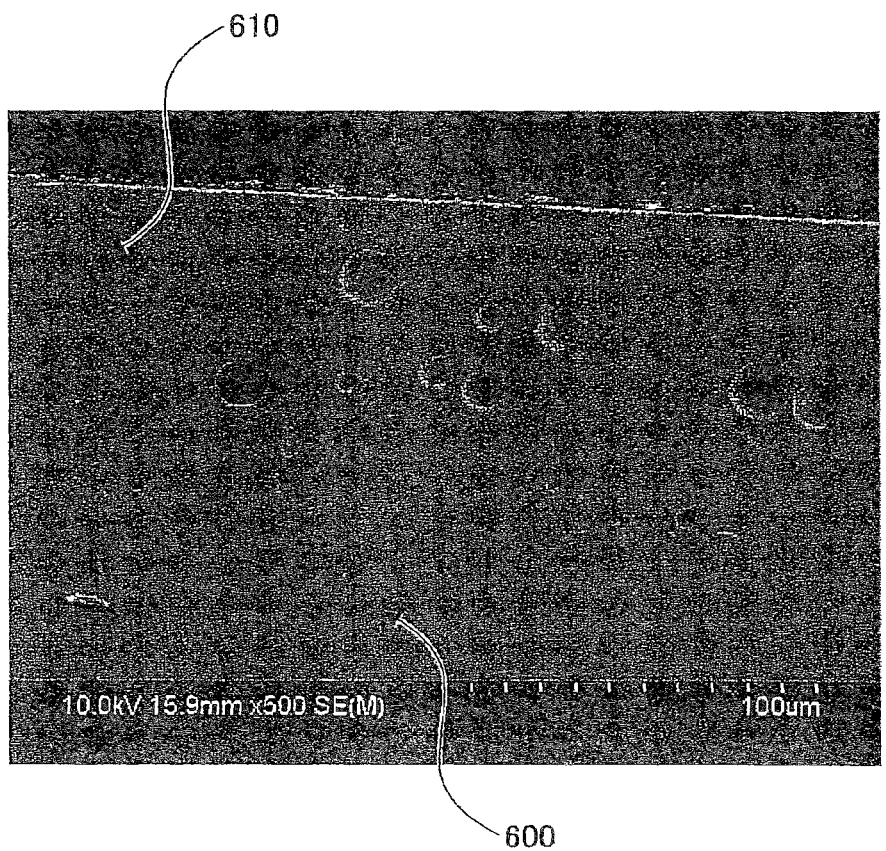
FIG. 10 is a photograph of a densely formed insulating layer obtained by a scanning electron microscope (SEM).

The method of confirming the densely formed insulating layer includes coating of Cu particles on an entire surface of the insulating layer 610. A pair of electrodes are installed on the surface of the insulating layer 610 and on the outer surface of the cylindrical metallic member 600. A voltage of 500 V is applied between the pair of the electrodes to measure a resistance between the surface of the insulating layer 610 and the outer surface of the cylindrical metallic member 600. The resistance is measured by a digital ultrahigh resistance and microammeter, type: R8340, manufactured by ADVANTEST CORPORATION. It has been found that an insulating layer having a thickness of 20 μm or more is densely formed if the resistance between the surface of the insulating layer 610 and the outer surface of the cylindrical metallic member 600 is more than $4.0 \times 10^4 \Omega$. FIG. 10 is a photograph of a densely formed insulating layer obtained by a scanning electron microscope (SCM). Referring to FIG. 10, an image of a densely formed insulating layer 610 having a thickness of 20 μm or more (400 μm) is magnified by 500 times using a scanning electron microscope (SEM) manufactured by Hitachi High-Technologies Corporation. The resistance of this densely formed insulating layer 610 was more than $4.0 \times 10^4 \Omega$. The resistance value between the surface of an insulating layer having a thickness of 20 μm or more on which through pores exist and the outer surface of a cylindrical metallic member 600 was less than $4.0 \times 10^4 \Omega$.

Moisture is assumed not to intrude into pores of the densely formed insulating layers. Even if the moisture intrudes into the pores, as long as the pores do not penetrate the insulating layer in its thickness direction, the moisture is assumed not to be able to conduct electricity between the honeycomb structure 200 and the cylindrical metallic member 600. Therefore, if the densely formed insulating layer 610 is formed on the inner surface of the cylindrical metallic member 600, the cylindrical metallic member 600 is apt to be ensurely insulated from the honeycomb structure 200.

It is preferable that the thickness of the insulating layer 610 is in a range of about 20 μm to about 400 μm.

If the thickness of the insulating layer 610 is about 20 μm or more, it is less apt to be difficult to ensure the insulation property between the cylindrical metallic member 600 and the honeycomb structure 200. Meanwhile, if the thickness of the insulating layer 610 is about 400 μm or less, a crack is less apt to be generated in the insulating layer 610 at times of manufacturing the insulating layer 610 and/or using the exhaust gas processing device 100. Then, it becomes less apt to be difficult to ensure the insulation property.

The insulating layer 610 preferably includes a glass layer. The glass layer may be any layer containing a glass ingredient such as quartz glass and alkali glass.

The reason why the glass layer becomes the densely formed insulating layer is that air inside molten glass is apt to be extracted when the glass ingredient is melted in a process of forming the glass layer on the inner surface 602 of the cylindrical metallic member 600.

For example, a glass ingredient in the glass layer may be barium glass, boron glass, strontium glass, alumina silicate glass, soda-zinc glass, or soda-barium glass, and so on. The glass ingredient in the glass layer may be one or a combination of the above-mentioned kinds of glass.

For example, the melting point of the glass layer is preferably about 400 to about 1000° C. If the melting point of the glass layer is about 400° C. or more, the glass layer is less apt to easily soften when the exhaust gas processing device is used. Then, an effect of the insulation is less apt to be lost. On the other hand, if the melting point of the glass layer is about 1000° C. or less, a heat treatment at a high temperature becomes unnecessary at a time of forming the glass layer in the cylindrical metallic member. At this time, the cylindrical metallic member is less apt to be degraded.

It is preferable that the thickness of the glass layer is in a range of about 20 to about 400 µm. If the thickness of the glass layer is about 20 µm or more, it is less apt to be difficult to ensure the insulation property between the cylindrical metallic member 600 and the honeycomb structure 200. Meanwhile, if the thickness of the glass layer is about 400 µm or less, a crack is less apt to be generated in the glass layer at times of manufacturing the glass layer and/or using the exhaust gas processing device 100. Then, it becomes less apt to be difficult to ensure the insulation property.

Alternatively, the insulating layer 610 is preferably a mixed layer formed by an amorphous binder (glass ingredient) and a crystalline metal oxide.

For example, the amorphous binder may be barium glass, boron glass, strontium glass, alumina silicate glass, soda-zinc glass, or soda-barium glass, and so on.

For example, the crystalline metal oxide may be at least one of ferric oxide, cobalt oxide, copper oxide, manganese oxide, chrome oxide, and aluminum oxide.

The reason why the mixed layer becomes the densely formed insulating layer is that air inside the amorphous binder (glass ingredient) is apt to be extracted when the amorphous binder (glass ingredient) is melted in a process of forming the glass layer on the inner surface 602 of the cylindrical metallic member 600.

It is preferable that the thickness of the mixed layer is in a range of about 50 to about 400 µm. If the thickness of the mixed layer is about 50 µm or more, it is less apt to be difficult to ensure the insulation property between the cylindrical metallic member 600 and the honeycomb structure 200. Meanwhile, if the thickness of the mixed layer is about 400 µm or less, a crack is less apt to be generated in the mixed layer at times of manufacturing the mixed layer and/or using the exhaust gas processing device 100. Then, it becomes less apt to be difficult to ensure the insulation property.

Figure 4:
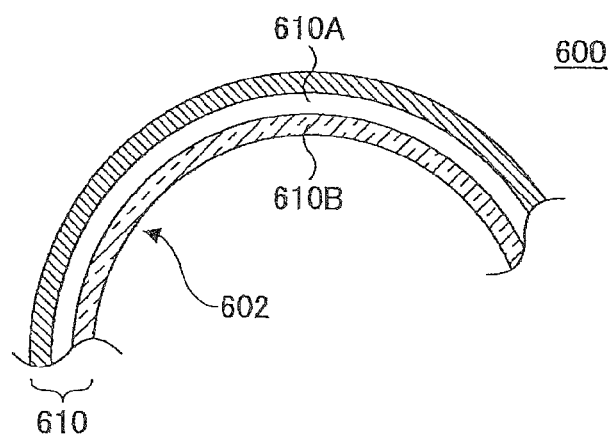
FIG. 4 is a cross-sectional view schematically illustrating a part of another exemplary cylindrical metallic member included in the exhaust gas processing device of the embodiment of the present invention.

FIG. 4 is a cross-sectional view schematically illustrating a part of other exemplary cylindrical metallic member included in the exhaust gas processing device of the embodiments of the present invention.

FIG. 4 is a partial view illustrating other mode of the inner surface 602 of the cylindrical metallic member 600.

Referring to FIG. 4, the insulating layer 610 installed on the inner surface of the cylindrical metallic member 600 has a double layer structure. Said differently, the insulating layer 610 includes a first layer 610A and a second layer 610B in an order from the central axis of the cylindrical metallic member 600 to the outer periphery of the cylindrical metallic member 600. The second layer 610B may be the above-mentioned glass layer. The first layer 610A increases adhesion between the inner surface 602 of the cylindrical metallic member 600 and the second layer 610B. The first layer 610A may be the above-mentioned mixed layer.

For example, the first layer 610A preferably has a coefficient of thermal expansion between a coefficient of thermal expansion "α0" of the cylindrical metallic member 600 and a coefficient of thermal expansion "αB" of the second layer 610B. For example, if the cylindrical metallic member 600 is made of stainless steel (SUS304), the coefficient of thermal expansion "α0" of the cylindrical metallic member 600 is about $17.6 \times 10^{-6}/°$ C. If the second layer 610B is made of quartz glass, the coefficient of thermal expansion "αB" of the second layer 610B is about $0.56 \times 10^{-6}/°$ C. In this case, if the range of the coefficient of thermal expansion "αA" of the first cylindrical layer 600A is determined to be in a range of from about $0.6 \times 10^{-6}/°$ C. to about $17 \times 10^{-6}/°$ C., it is possible to form the insulating layer 610 having good adhesion between the first layer 610 and the cylindrical metallic member 600 of the exhaust gas processing device 100.

When the insulating layer 610 has the double layer structure, the first layer 610A has a thickness of about 50 µm or more and/or the second layer 610 has a thickness of about 20 µm or more. If the thickness of the first layer 610A is about 50 µm or more and the thickness of the second layer 610 is about 20 µm or more, it becomes less apt to be difficult to ensure the insulation property between the cylindrical metallic member 600 and the honeycomb structure 200. If the insulating layer 610 has a double layer structure, the thickness of the insulating layer 610B is preferably about 400 µm or less. If the thickness of the insulating layer 610B having the double layer structure is about 400 µm or less, a crack may be less apt to be generated in the insulating layer 610 having the double layer structure at times of manufacturing the insulating layer 610 and/or using the exhaust gas processing device 100. Therefore, it becomes less apt to be difficult to ensure the insulation property.

Although the double layer structure is adopted in the insulating layer 610 of FIG. 4, the number of the layers forming the insulating layer is not limited thereto. For example, the insulating layer 610 may be a triple layer structure, a quad layer structure, and so on.

Since the insulating layer 610 is formed at a portion of the inner surface 602 of the cylindrical metallic member 600 in contact with the inorganic mat member 500 in the embodiments of the present invention, even if the electric resistance of the inorganic mat member 500 decreases at a time of using the exhaust gas processing device 100, it is apt to be able to significantly prevent the electric current applied to the honeycomb structure 200 from leaking to the cylindrical metallic member 600.

(Other Components Forming the Exhaust Gas Processing Device)

The other components forming the exhaust gas processing device 100 of the embodiments of the present invention is described in detail.

(Honeycomb Structure)

Referring to FIG. 2, the honeycomb structure has a substantially cylindrical shape. However, the shape of the honeycomb structure 200 is not specifically limited. For example, the shape of the honeycomb structure 200 may be a substantially elliptic pillar, a substantially quadratic pillar, a substantially polygonal pillar, and so on.

In the example of the exhaust gas processing device illustrated in FIG. 2, the honeycomb structure 200 has a so-called integral structure in which a single honeycomb unit is included. However, the honeycomb structure may have a so-called separable structure in which plural honeycomb units are included.

Figure 5:
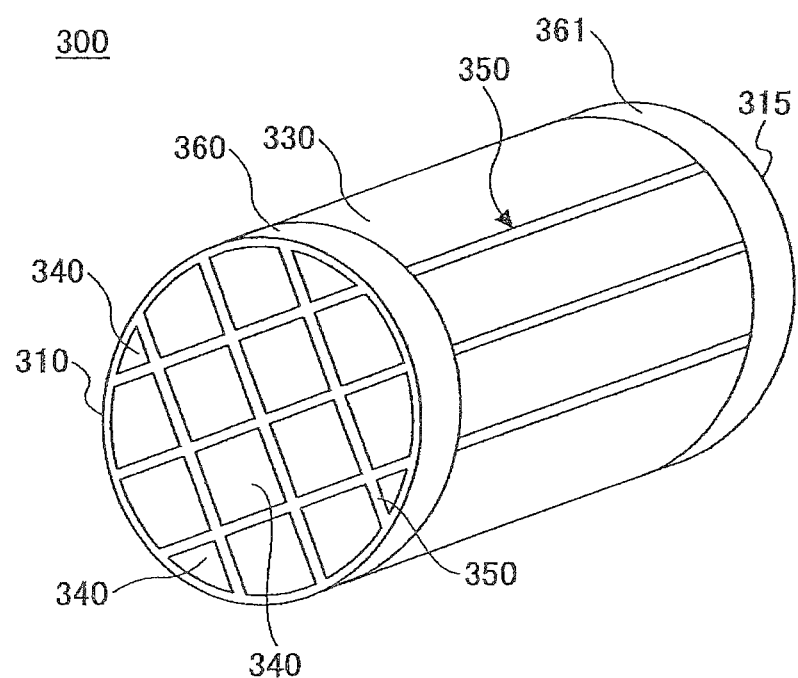
FIG. 5 is a perspective view schematically illustrating other exemplary honeycomb structure included in the exhaust gas processing device of the embodiment of the present invention.
Figure 8:
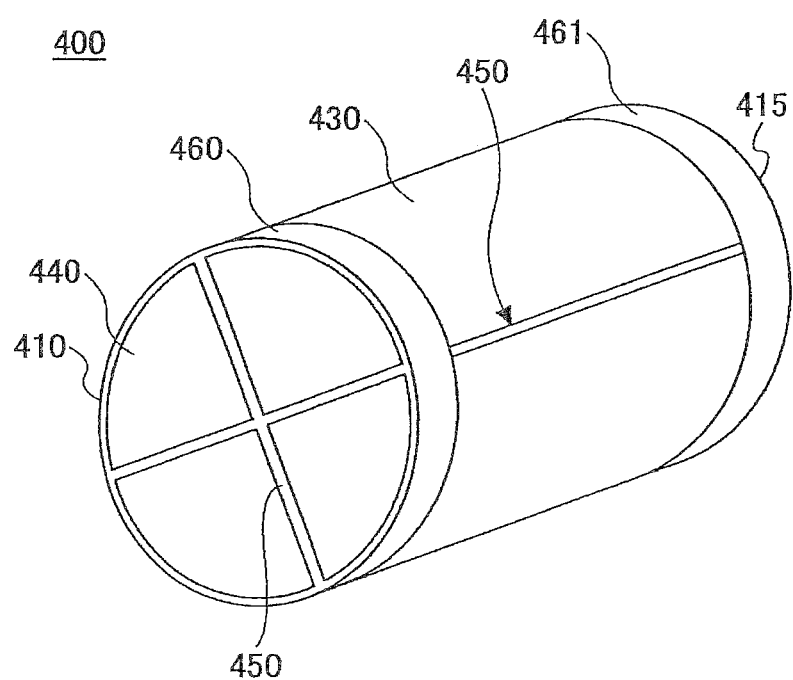
FIG. 8 is a perspective view schematically illustrating other exemplary honeycomb structure included in the exhaust gas processing device of the embodiment of the present invention.

FIG. 5 and FIG. 8 are perspective views schematically illustrating other exemplary honeycomb structures included in the exhaust gas processing device of the embodiments of the present invention.

Figure 6:
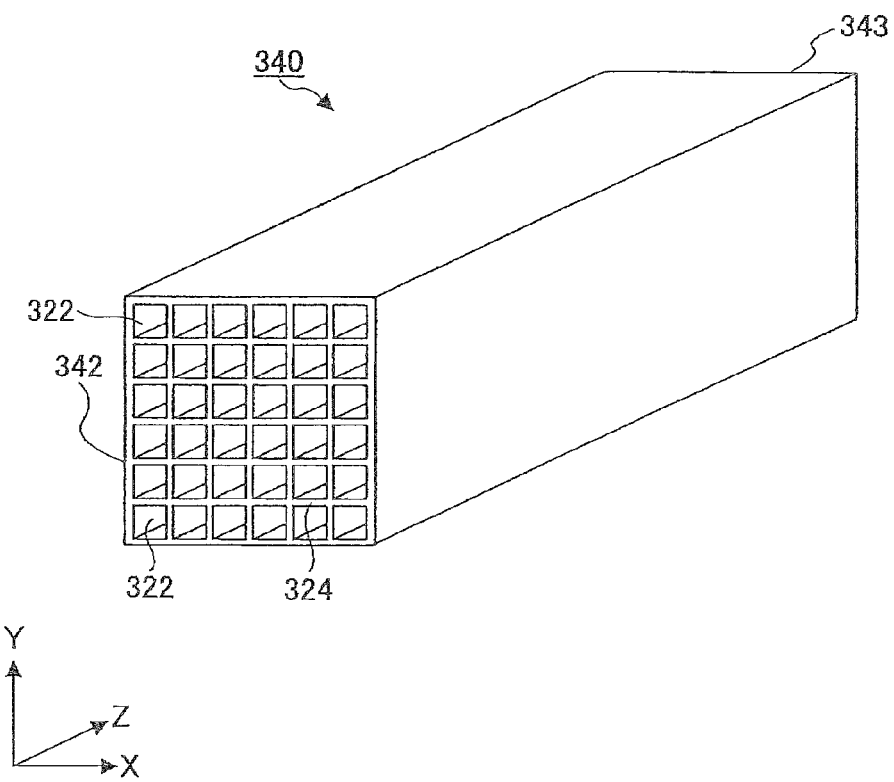
FIG. 6 is a perspective view schematically illustrating an exemplary honeycomb unit forming the honeycomb structure illustrated in FIG. 5.

FIG. 5 and FIG. 8 illustrate honeycomb structures 300 having other separable structures. FIG. 6 schematically illustrates an example honeycomb unit forming the honeycomb structure 300 illustrated in FIG. 5.

Referring to FIG. 5, the honeycomb structure 300 includes two opened end surfaces 310 and 315 and an outer peripheral surface 330.

The honeycomb structure 300 is formed by connecting plural honeycomb units 340 by interposing adhesive layers 350. The honeycomb structure 300 illustrated in FIG. 5 includes vertically arranged four substantially rectangular pillars and horizontally arranged four substantially rectangular pillars. After vertically and horizontally arranging and joining the four substantially rectangular pillars by interposing the adhesive layer 350, the periphery of the outer peripheral surface 330 is processed in a substantially cylindrical shape.

Referring to FIG. 6, the honeycomb units 340 extend from end surfaces 342 to other end surfaces 343 along longitudinal directions of the honeycomb units 340. The honeycomb units 340 include plural cells 322 opened at the both end surfaces 342 and 343 and cell walls 324 for separating the cells 322. The honeycomb units 340 may be made of a material whose main component may be, for example, silicon carbide (SiC). In order to decrease the electric resistance, a small amount of an electric resistance adjusting element such as an aluminum nitride (AlN) may be added to the honeycomb unit 340. A catalytic agent is carried on the cell wall of the honeycomb unit 340.

In the honeycomb structure 300 illustrated in FIG. 5, in a manner similar to the honeycomb structure 200 illustrated in FIG. 2, a pair of electrodes 360 and 361 are located at any portions of the outer peripheral surface 330. For example, the pair of the electrodes 360 and 361 is located in the vicinity of the end surfaces of the outer peripheral surface 330 in FIG. 5. The honeycomb structure 300 undertakes resistance heating when electricity is applied to both the electrodes 360 and 361.

Figure 9:
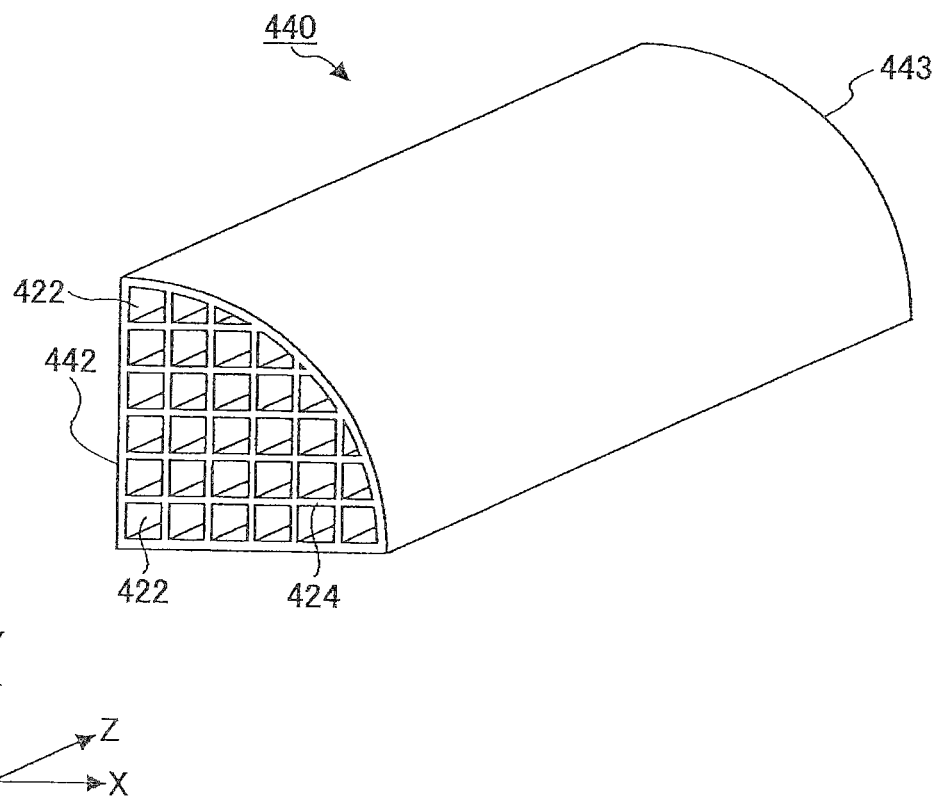
FIG. 9 is a perspective view schematically illustrating an exemplary honeycomb unit forming the honeycomb structure illustrated in FIG. 8.

FIG. 8 illustrates a honeycomb structure 400 having other separable structure. FIG. 9 schematically illustrates an example honeycomb unit forming the honeycomb structure 400 illustrated in FIG. 8.

Referring to FIG. 8, the honeycomb structure 400 includes two opened end surfaces 410 and 415 and an outer peripheral surface 430.

The honeycomb structure 400 is formed by connecting plural honeycomb units 440 by interposing adhesive layers 450. For example, in the honeycomb structure illustrated in FIG. 8, the honeycomb structure 400 is formed by four honeycomb units. The four honeycomb units 440 shaped substantially like a fan-pillar are arranged so that the outer peripheral flat surfaces of the four honeycomb units 440 face each other and joined to each other by interposing the adhesive layers 450. The above shape substantially like the fan-pillar is a substantially cylindrical-pillar cut by two or more honeycomb units and has a cross-sectional view perpendicular to the longitudinal direction of the honeycomb unit defined by two straight lines having the substantially same lengths and in contact with each other at ends of the two lines and one substantially circular arc connected to the other ends of the two straight lines at the ends of the substantially circular arc. The shape and number of the fan-pillar are not limited to the above and any shape and any number can be employed.

Referring to FIG. 8, the honeycomb units 440 include plural cells 422 opened at both end surfaces 442 and 443 and cell walls 424 separating the cells 422. The honeycomb units 440 may be made of a material whose main component may be, for example, silicon carbide (SiC). In order to decrease the electric resistance, a small amount of an electric resistance adjusting element such as aluminum nitride (AlN) may be added to the honeycomb unit 340. A catalytic agent is carried by the cell wall 424 of the honeycomb unit 440.

In the honeycomb structure 400 illustrated in FIG. 8, in a manner similar to the honeycomb structures 200 and 300 illustrated in FIG. 2 and FIG. 5, a pair of electrodes 460 and 461 is located at any portions of the outer peripheral surface 430. For example, the electrodes 460 and 461 are located on the outer peripheral surface 430 in the vicinity of the end surfaces. The honeycomb structure 400 undertakes resistance heating when electricity is applied to both the electrodes 460 and 461.

Various members included in the honeycomb structures 300 and 400 having the separable structure are described next.

(Honeycomb Unit)

The honeycomb units 340 and/or 440 may be made of a material whose main component is silicon carbide (SiC). In order to decrease the electric resistance, a small amount of an electric resistance adjusting element such as aluminum nitride (AlN) is added to the honeycomb units 340 and 440.

The cross-sectional shape of the honeycomb units 340 and 440 perpendicular to the longitudinal direction of the honeycomb units 340 and 440 are not specifically limited and may be any shape. The shape of the honeycomb unit 340 may be a substantially square, a substantially rectangle, a substantially hexagon, and so on.

The cross-sectional shapes of the cell 322 of the honeycomb unit 340 and/or the cells 422 of the honeycomb unit 440 in perpendicular to the longitudinal direction of the cells 322 and 422 are not specifically limited and may further be a substantially triangle, a substantially polygon or the like in addition to a substantially square.

The cell density of the honeycomb unit 340 and/or 440 is preferably in a range of about 15.5 to about 186 pieces/cm$^2$ (about 100 to about 1200 cpsi), more preferably in a range of about 46.5 to about 170 pieces/cm$^2$ (about 150 to about 800 cpsi) and further more preferably in a range of about 62 to about 155 pieces/cm$^2$ (about 150 to about 400 cpsi).

The porosities of the honeycomb units 340 and/or 440 are preferably in a range of about 35% to about 70%.

The thicknesses of the cell walls 324 of the honeycomb unit 340 and/or the thicknesses of the cell walls 424 of the honeycomb unit 440 are not specifically limited. However, a preferable lower limit is about 0.1 mm in consideration of the strength, and a preferable upper limit is about 0.4 mm in consideration of a conversion capability.

The catalytic agents carried on the cell walls 324 of the honeycomb unit 340 and/or the cell walls 424 of the honeycomb unit 440 are not specifically limited and may be platinum, rhodium, palladium, and so on. The catalytic agents may be carried on the cell wall 324 and/or the cell wall 424 interposing an alumina layer between the catalytic agents and the cell wall 324 and/or the cell wall 424.

(Adhesive Layer)

Raw materials of the adhesive layer 350 and/or the adhesive layer 450 of the honeycomb structure 300 and/or the honeycomb structure 400 is a paste for the adhesive layer. The paste for the adhesive layer may contain an inorganic particle, an inorganic binder, an inorganic fiber and/or an organic binder.

The inorganic particle for the paste for the adhesive layer is preferably silicon carbide (SiC). For example, the inorganic binder may be an inorganic sol, a clay binder, and so on. Examples of the inorganic sol are alumina sol, silica sol, titania sol, water glass, and so on. For example, the clay binder may be white clay, kaolin (porcelain clay), montmorillonite, sepiolite, attapulgite, and so on. These inorganic binders may be one or a combination of the above.

These inorganic binders may preferably be alumina sol, silica sol, titania sol, water glasses, epiolite, and attapulgite.

The material of the inorganic fiber may preferably be alumina, silica, silicon carbide, silica alumina, glass, potassium titanate, aluminum borate, and so on. The inorganic fiber may be one or a combination of the above. The material of the inorganic fiber is more preferably silica alumina.

The organic binder is not specifically limited. For example, the organic binder may be one or a combination of polyvinyl alcohol, methyl cellulose, ethyl cellulose, carboxymethyl cellulose, and so on. The organic binder is preferably carboxymethyl cellulose.

The thickness of the adhesive layer may be preferably in a range of about 0.3 to about 2 mm. If the thickness of the adhesive layer is about 0.3 mm or more, sufficient adhesion strength between the adhesive layer and the honeycomb unit is apt to be obtainable. On the other hand, if the thickness of the adhesive layer is about 2 mm or less, the pressure loss of the honeycomb structure is less apt to increase. The number of the joined honeycomb units is appropriately selected in conformity with the size of the honeycomb structure.

(Inorganic Mat Member 500)

The composition of the inorganic mat member 500 may be a mat member having any composition as long as the inorganic fiber is contained in the inorganic mat member.

For example, the inorganic mat member 500 may contain an inorganic fiber (for example, an average diameter of about 3 to about 8 μm) made of alumina and silica. The inorganic mat member 500 may contain an organic binder.

The thickness of the inorganic mat member 500 is preferably in a range of about 1 to about 20 mm when the inorganic mat member 500 is accommodated in the cylindrical metallic member 600.

If the thickness of the inorganic mat member 500 is about 1 mm or more, a buffer effect between the honeycomb structures 200, 300 and 400 and the cylindrical metallic member 600 becomes less apt to be insufficient when the honeycomb structures 200, 300 and 400 and the cylindrical metallic member 600 are actually installed in a vehicle or the like. Thus, there may be less apt to occur a problem that the honeycomb structures 200, 300 and 400 are broken. Meanwhile, if the thickness of the inorganic mat member 500 is about 20 mm or less, force for retaining the honeycomb structures 200, 300 and 400 decreases when the honeycomb structures 200, 300 and 400 are actually installed in a vehicle or the like. Thus, there may be less apt to occur a problem that the honeycomb structures 200, 300 and 400 drop off the cylindrical metallic member 600.

The density of the inorganic mat member 500 is preferably in a range of about 0.05 $g/cm^3$ to about 0.5 $g/cm^3$ when the inorganic mat member 500 is accommodated in the cylindrical metallic member 600. If the density of the inorganic mat member 500 is about 0.05 $g/cm^3$ or more, a buffer effect between the honeycomb structures 200, 300 and 400 and the cylindrical metallic member 600 becomes less apt to be insufficient when the honeycomb structures 200, 300 and 400 and the cylindrical metallic member 600 are actually installed in a vehicle or the like. Thus, there may be a problem that the honeycomb structures 200, 300 and 400 are broken. If the density of the inorganic mat member 500 is about 0.5 $g/cm^3$ or less, a pressure received by the inorganic member 500 from the cylindrical metallic member 600 and the honeycomb structures 200, 300 and 400 becomes less apt to be great. Thus, there may be a problem that the inorganic mat member 500 is less apt to be crushed or broken.

(Manufacturing Method of the Exhaust Gas Processing Device)

Next, a manufacturing method of the exhaust gas processing device 100 of the embodiments of the present invention is described.

When the exhaust gas processing device 100 of the embodiment of the present invention is manufactured, the inorganic mat member 500 is wound around the outer peripheral surfaces of the honeycomb structures 200, 300 and 400, and then the honeycomb structures 200, 300 and 400 having the inorganic mat member 500 are accommodated in the cylindrical metallic member 600.

Hereinafter, an example manufacturing method of the honeycomb structure and an example method of forming the insulating layer on the cylindrical metallic member are described.

(Manufacturing Method of the Honeycomb Structure)

The honeycomb structure is manufactured by the following method.

A manufacturing method of the honeycomb structures 300 and 400 in the "separable structure" illustrated in FIG. 5 and FIG. 8 is described. The manufacturing method of the honeycomb unit is applicable to manufacture the honeycomb structure 200 having an integral structure except for adhesion of plural honeycomb units with adhesive layers.

The main component of a raw material paste is silicon carbide (SiC). The raw material paste undergoes extrusion molding and so on to manufacture a molded body of a honeycomb unit. In order to adjust the electric resistance of the honeycomb unit, aluminium nitride (AlN) or the like of an appropriate amount may be added to the raw material paste.

An organic binder, a dispersion medium, and/or a molding auxiliary agent may be appropriately added to the raw material paste. The organic binder is not specifically limited. For example, the organic binder may be one or a combination of methyl cellulose, carboxymethyl cellulose, hydroxyethyl cellulose, polyethylene glycol, phenol resin, and epoxy resin. The amount of the organic binder is about 1 to about 10 parts by weight relative to the inorganic particle, the inorganic binder and the inorganic fiber of 100 parts by weight in total.

The dispersing medium is not specifically limited and may be water, an organic solvent such as benzene, and alcohol such as methanol. The molding auxiliary agent is not specifically limited and may be ethylene glycol, dextrin, fatty acid, fatty acid soap, polyalcohol, and so on.

The raw material paste is not specifically limited and preferably mixed and kneaded. The raw paste may be kneaded by a mixer, an attritor or the like, or sufficiently kneaded by a kneader or the like. The method of molding the raw material paste is not specifically limited and may be preferably extrusion molding so as to have a shape having cells.

It is preferable to dry the obtained molded body of the honeycomb unit. A drying apparatus used for drying the molded body is not specifically limited, and may be a microwave drying apparatus, a hot air drying apparatus, a dieelectric drying apparatus, a decompression drying apparatus, a vacuum drying apparatus, a freeze drying apparatus, and so on. It is preferable to degrease the obtained molded body of the honeycomb unit. Conditions for degreasing the molded body of the honeycomb unit are not specifically limited and are appropriately selectable depending on the kinds and the amounts of the organic substances. The conditions are preferably about two hours at a temperature of about 400° C. After degreasing the molded body of the honeycomb unit, the molded body of the honeycomb unit is fired. Conditions for firing the molded body of the honeycomb unit are not specifically limited. For example, the conditions are preferably about three hours at a temperature of about 2200° C. under an atmosphere of an inert gas, for example, argon.

Next, an adhesive layer paste which will be an adhesive layer and has an even thickness is coated on side surfaces of the honeycomb units. The honeycomb units are sequentially joined by interposing the adhesive layer paste after laminating the honeycomb units. This process is repeated to manufacture a honeycomb structure (an assembly of honeycomb units) having a predetermined size.

Next, the honeycomb structure is heated to dry, degrease and solidify the adhesive layer paste to form the adhesive layer and simultaneously fix the honeycomb units to one another. The heating temperature of the honeycomb unit is preferably about 500° C. to about 800° C., more preferably about 600° C. to about 700° C. If the temperature for heating the honeycomb structure is about 500° C. or more, condensation polymerization of the inorganic binder contained in the adhesive layer paste is apt to proceed. Then, the adhesion strength of the adhesive layer is less apt to be lowered. In this case, there may be less apt to occur a problem that the honeycomb unit drops off when the honeycomb unit is actually used in a vehicle or the like. Meanwhile, if the temperature of heating the honeycomb unit is about 800° C. or less, the condensation polymerization of the inorganic binder contained in the adhesive layer paste is apt to be completed. In this case, there may be problems that an effect of further enhancing the adhesion strength of the honeycomb unit is apt to be obtainable and the productivity becomes less apt to be bad.

The time duration for heating the honeycomb structure is about 2 hours.

Then, the catalytic agent is carried on the cell walls of the honeycomb unit forming the honeycomb structure.

The electrodes are located on the outer peripheral surface of the honeycomb structure. The electrodes may be formed by thermal spraying of metal, sputtering of metal or the like as described above.

The honeycomb structures 300 and 400 of the separable structure as illustrated in FIG. 5 and FIG. 8 can be manufactured with the following process.

(Forming Method of the Insulating Layer on the Cylindrical Metallic Member)

The insulating layer 610 of the cylindrical metallic member 600 is formed by the following method.

At first, the cylindrical metallic member 600 is prepared. For example, the cylindrical metallic member 600 may be stainless steel (e.g., SUS304 and SUS430) or a nickel base alloy.

The insulating layer 610 is formed on the inner surface 602 of the cylindrical metallic member 600. As described, the insulating layer 610 may include a glass layer and a mixed layer.

A forming method of the insulating layer 610 is not specifically limited and may be an ordinary coating method such as a spray coating method and a brush painting method.

The similar forming method is applicable to an insulating layer having two or more layers.

Coating and baking of the insulating layer may be repeated by several times to ensure the density.

Ordinarily, the formed insulating layer is fired to thereby fix the insulating layer to an inner surface of a cylindrical metallic member. For example, if the above mentioned glass layer or mixed layer is used as the insulating layer, the firing temperature after forming the insulating layer is preferably in a range of about 400 to about 1000° C.

If the firing temperature after forming the insulating layer is about 400° C. or more, the material of the insulating layer 610 and the material of the cylindrical metallic member 600 can cause chemical bonding at an interface between the insulating layer 610 and the cylindrical metallic member 600. Therefore, a composite oxide of the materials of the insulating layer 610 and the cylindrical metallic member 600 is apt to be produced thereby being less apt to lower the adhesion between the insulating layer 610 and the cylindrical metallic member 600. In this case, there may be less apt to occur a problem that the insulating layer 610 peels off the cylindrical metallic member 600. Meanwhile, if the firing temperature after forming the insulating layer is about 1000° C. or less, the cylindrical metallic member 600 is less apt to be deformed.

EXAMPLE

Hereinafter, examples of the present invention are described.

Example 1

A cylindrical metallic member having an insulating layer formed on an inner surface of the cylindrical metallic member was prepared as follows. Further, an exhaust gas processing device including the cylindrical metallic member was manufactured.

(Manufacture of the Cylindrical Metallic Member)

The cylindrical metallic member was made of a steel pipe of SUS304 having an outer diameter of 105 mm, a wall thickness of 2 mm and a total length of 90 mm. Before the use, the steel pipe of SUS304 underwent ultrasonic cleaning in alcohol.

The inner surface of the steel pipe of SUS304 underwent sandblasting. In sandblasting, alumina abrasive grains of an abrasive number #80 were used and a treatment time was 10 minutes. The maximum height Rz of the inner surface of the steel pipe of SUS304 is 2.5 μm after sandblasting the steel pipe.

Next, the insulating layer was formed on the inner surface of the steel pipe of SUS304 as follows.

First, water of 100 parts by weight was added to silicate glass powder containing barium of 100 parts by weight. The water and silicate glass powder underwent wet blending using a ball mill to thereby prepare slurry.

This slurry was spray-coated on the inner surface of the steel pipe of SUS304. The slurry was dried for two hours. Thereafter, the steel pipe of SUS304 was held for 20 minutes under a temperature of 900° C. to thereby form a glass layer on the inner surface of the steel pipe of SUS304. The thickness of the glass layer was 30 μm.

Hereinafter, the steel pipe of SUS304 is referred to as a "cylindrical metallic member of Example 1".

(Manufacture of the Exhaust Gas Processing Device)

The exhaust gas processing device was manufactured as follows.

Figure 7:
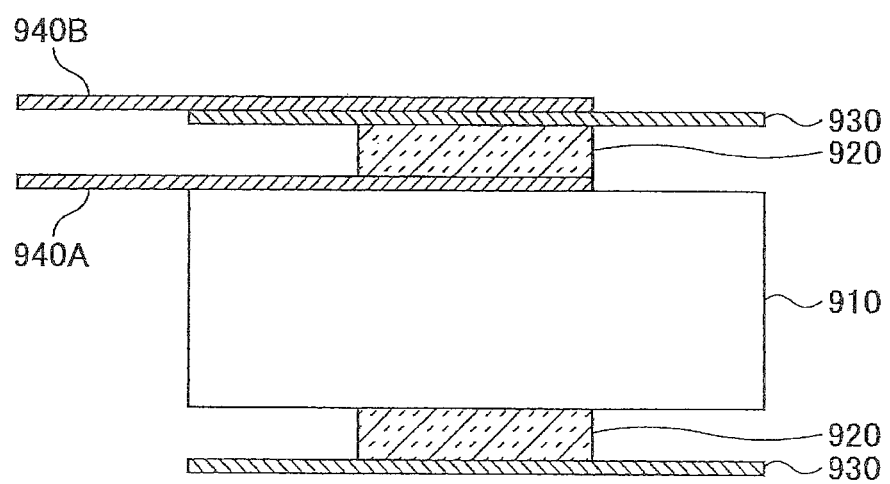
FIG. 7 is a cross-sectional view schematically illustrating the exhaust gas processing device of an example and a comparative example.

FIG. 7 is a cross-sectional view schematically illustrating the exhaust gas processing device of an example and a comparative example.

FIG. 7 schematically illustrates an example exhaust gas processing device of Example 1. The exhaust gas processing device 900 includes a honeycomb structure 910, an inorganic mat member 920, a cylindrical metallic member 930 of Example 1, and a pair of probe electrodes 940A and 940B.

A honeycomb structure 300 as illustrated in FIG. 5 was the honeycomb structure 910. Referring to FIG. 7, the honeycomb structure 910 has a cylindrical honeycomb structure of an inner diameter of 93 mm and a total length of 100 mm. The honeycomb units forming the honeycomb structure 910 were made of silicon carbide.

The probe electrode 940A for measurement made of aluminum was attached to a side surface of the honeycomb structure 910. The probe electrode 940A for measurement has dimensions of the total length of 100 mm, the width of 10 mm and the thickness of 0.3 mm. The probe electrode 940A for measurement was fixed to the side surface of the honeycomb structure 910 using a commercially available insulating tape.

The inorganic mat member 920 was wound around the side surface of the honeycomb structure 910. The inorganic mat member 920 is made of alumina fiber. The width of the inorganic mat member 920 in the width direction of FIG. 7 is 30 mm.

Next, the honeycomb structure 910 around which the inorganic mat member was wound was press-fit into the cylindrical metallic member 930 of Example 1. The thickness of the inorganic mat member 920 accommodated in the cylindrical metallic member 930 was 4 mm.

The other probe electrode 940B for measurement made of aluminum was located on the outer surface of the cylindrical metallic member 930 of Example 1. The probe electrode 940B for measurement has dimensions of the total length of 100 mm, the width of 10 mm and the thickness of 0.3 mm. The probe electrode for measurement 940B was fixed to the outer surface of the cylindrical metallic member 930 of Example 1 by a commercially available insulating tape.

The exhaust gas processing device 900 obtained as described above is referred to as an "exhaust gas processing device of Example 1".

Example 2

In a similar manner to Example 1, a cylindrical metallic member of Example 2 and an exhaust gas processing device of Example 2 were manufactured. With Example 2, the difference from Example 1 is that the thickness of a glass layer formed on the inner surface of the cylindrical metallic member is 20 μm. The other conditions for manufacturing the cylindrical metallic member and the exhaust gas processing device are similar to those in Example 1.

Example 3

In a similar manner to Example 1, a cylindrical metallic member of Example 3 and an exhaust gas processing device of Example 3 were manufactured. With Example 3, the difference from Example 1 is that the thickness of a glass layer formed on the inner surface of the cylindrical metallic member is 80 μm. The other conditions for manufacturing the cylindrical metallic member and the exhaust gas processing device are similar to those in Example 1.

Example 4

In a similar manner to Example 1, a cylindrical metallic member of Example 4 and an exhaust gas processing device of Example 4 were manufactured. With Example 4, the difference from Example 1 is that the thickness of a glass layer formed on the inner surface of the cylindrical metallic member is 400 μm. The other conditions for manufacturing the cylindrical metallic member and the exhaust gas processing device are similar to those in Example 1.

Comparative Example 1

In a similar manner to Example 1, a cylindrical metallic member of Comparative Example 1 and an exhaust gas processing device of Comparative Example 1 were manufactured. With Comparative Example 1, the difference from Example 1 is that the thickness of a glass layer formed on the inner surface of the cylindrical metallic member is 8 μm. The other conditions for manufacturing the cylindrical metallic member and the exhaust gas processing device are similar to those in Example 1.

Comparative Example 2

In a similar manner to Example 1, a cylindrical metallic member of Comparative Example 2 and an exhaust gas processing device of Comparative Example 2 were manufactured. With Comparative Example 2, the difference from Example 1 is that the thickness of a glass layer formed on the inner surface of the cylindrical metallic member is 600 μm. The other conditions for manufacturing the cylindrical metallic member and the exhaust gas processing device are similar to those in Example 1.

Example 5

In a similar manner to Example 1, a cylindrical metallic member of Example 5 and an exhaust gas processing device of Example 5 were manufactured. However, in Example 5, an insulating layer is formed on the inner surface of a steel pipe of SUS304 as follows.

Manganese oxide ($MnO_2$) powder, iron oxide (FeO) powder, copper oxide (CuO) powder, and the above-mentioned silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending to thereby prepare slurry.

This slurry was spray-coated on the inner surface of the steel pipe of SUS304. The slurry was dried for two hours. Thereafter, the steel pipe of SUS304 was heated at 900° C. for 20 minutes to thereby form a mixed layer of crystalline metal oxide and an amorphous binder on the inner surface of the steel pipe of SUS304. The thickness of the mixed layer was 50 μm.

Hereinafter, the steel pipe of SUS304 is referred to as a "cylindrical metallic member of Example 5".

An exhaust gas processing device of Example 5 was manufactured in a similar manner to Embodiment 1 using the cylindrical metallic member of Example 5.

Example 6

In a similar manner to Example 5, a cylindrical metallic member of Example 6 and an exhaust gas processing device of Example 6 were manufactured. With Example 6, the difference from Example 1 is that the thickness of a glass layer formed on the inner surface of the cylindrical metallic member is 100 μm. The other conditions for manufacturing the cylindrical metallic member and the exhaust gas processing device are similar to those in Example 5.

Example 7

In a similar manner to Example 5, a cylindrical metallic member of Example 7 and an exhaust gas processing device of Example 7 were manufactured. With Example 7, the difference from Example 1 is that the thickness of a glass layer formed on the inner surface of the cylindrical metallic member is 400 μm. The other conditions for manufacturing the cylindrical metallic member and the exhaust gas processing device are similar to those in Example 5.

Example 8

In a similar manner to Example 1, a cylindrical metallic member of Example 8 and an exhaust gas processing device of Example 8 were manufactured. However, in Example 8, an insulating layer is formed on the inner surface of a steel pipe of SUS304 as follows.

Aluminum oxide ($Al_2O_3$) powder and the above-mentioned silicate glass powder containing barium underwent dry blending in a weight ratio of $Al_2O_3$:silicate glass powder of 10:90 to obtain mixed powder. Water of 100 parts by weight is added to the mixed powder of 100 parts by weight. Then, the water and mixed powder underwent wet blending to thereby prepare slurry.

This slurry was spray-coated on the inner surface of the steel pipe of SUS304. The slurry was dried for two hours. Thereafter, the steel pipe of SUS304 was heated at 900° C. for 20 minutes to thereby form a mixed layer of crystalline metal oxide and amorphous binder on the inner surface of the steel pipe of SUS304 The thickness of the mixed layer was 100 μm.

Hereinafter, the steel pipe of SUS304 is referred to as a "cylindrical metallic member of Example 8".

The exhaust gas processing device of Example 8 was manufactured in a similar manner to Example 1 using the cylindrical metallic member of Example 8.

Example 9

In a similar manner to Example 1, a cylindrical metallic member of Example 9 and an exhaust gas processing device of Example 9 were manufactured. However, in Example 9, an insulating layer is formed on the inner surface of a steel pipe of SUS304 as follows.

Manganese oxide ($Al_2O_3$) powder and the above-mentioned silicate glass powder containing barium underwent dry blending in a weight ratio of $MnO_2$:silicate glass powder of 15:85 to obtain mixed powder. Water of 100 parts by weight is added to the mixed powder of 100 parts by weight. Then, the water and mixed powder underwent wet blending to thereby prepare slurry.

This slurry was spray-coated on the inner surface of the steel pipe of SUS304. The slurry was dried for two hours. Thereafter, the steel pipe of SUS304 was heated at 900° C. for 20 minutes to thereby form a mixed layer of crystalline metal oxide and amorphous binder on the inner surface of the steel pipe of SUS304. The thickness of the mixed layer was 100 μm.

Hereinafter, the steel pipe of SUS304 is referred to as a "cylindrical metallic member of Example 8".

The exhaust gas processing device of Example 8 was manufactured in a similar manner to Example 1 using the cylindrical metallic member of Example 8.

Comparative Example 3

In a similar manner to Example 5, a cylindrical metallic member of Comparative Example 3 and an exhaust gas processing device of Comparative Example 3 were manufactured. With Example 3, the difference from Example 1 is that the thickness of a glass layer formed on the inner surface of the cylindrical metallic member is 600 μm. The other conditions for manufacturing the cylindrical metallic member and the exhaust gas processing device are similar to those in Example 5.

Comparative Example 4

In a similar manner to Example 5, a cylindrical metallic member of Comparative Example 4 and an exhaust gas processing device of Comparative Example 4 were manufactured. With Example 4, the difference from Example 1 is that the thickness of a glass layer formed on the inner surface of the cylindrical metallic member is 20 μm. The other conditions for manufacturing the cylindrical metallic member and the exhaust gas processing device are similar to those in Example 5.

Example 10

In a similar manner to Example 1, a cylindrical metallic member of Example 10 and an exhaust gas processing device of Example 10 were manufactured. However, in Example 10, an insulating layer is formed on the inner surface of a steel pipe of SUS304 as follows.

Manganese oxide ($MnO_2$) powder, iron oxide (FeO) powder, copper oxide (CuO) powder, and the above-mentioned silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending to thereby prepare first slurry.

This first slurry was spray-coated on the inner surface of the steel pipe of SUS304. The first slurry was dried for two hours. Thereafter, the steel pipe of SUS304 was heated at 900° C. for 20 minutes to thereby form a mixed layer of crystalline metal oxide and an amorphous binder on the inner surface of the steel pipe of SUS304. The thickness of the mixed layer was 5 μm.

Then, water of 100 parts by weight was added to the silicate glass powder containing barium of 100 parts by weight. The water and silicate glass powder underwent wet blending using a ball mill to thereby prepare a second slurry.

This second slurry was spray-coated on the inner surface of the steel pipe of SUS304. The second slurry was dried for two hours. Thereafter, the steel pipe of SUS304 was heated at 900° C. for 20 minutes to thereby form a glass layer on the mixed layer of the steel pipe of SUS304. The thickness of the glass layer was 20 μm.

Hereinafter, the steel pipe of SUS304 is referred to as a "cylindrical metallic member of Example 10".

The exhaust gas processing device of Example 10 was manufactured in a similar manner to Example 1 using the cylindrical metallic member of Example 10.

Example 11

In a similar manner to Example 10, a cylindrical metallic member of Example 11 and an exhaust gas processing device of Example 11 were manufactured. However, in Example 11, the thickness of the mixed layer formed on the outer surface of the cylindrical metallic member was 50 μm and the thickness of the glass layer was 5 μm. The other conditions for manufacturing the cylindrical metallic member and the exhaust gas processing device are similar to those in Example 10.

Example 12

In a similar manner to Example 10, a cylindrical metallic member of Example 12 and an exhaust gas processing device of Example 12 were manufactured. However, in Example 12, the thickness of the mixed layer formed on the inner surface of the cylindrical metallic member of Example 12 was 200 μm and the thickness of the glass layer is 200 μm. The other conditions for manufacturing the cylindrical metallic member and the exhaust gas processing device are similar to those in Example 10.

Example 13

In a similar manner to Example 10, a cylindrical metallic member of Example 13 and an exhaust gas processing device of Example 13 were manufactured. However, in Example 13, the thickness of the mixed layer formed on the inner surface of the cylindrical metallic member of Example 13 was 50 μm and the thickness of the glass layer is 25 μm. The other conditions for manufacturing the cylindrical metallic member and the exhaust gas processing device are similar to those in Example 10.

Example 14

In a similar manner to Example 10, a cylindrical metallic member of Example 14 and an exhaust gas processing device of Example 14 were manufactured. With Example 14, first slurry is prepared as follows.

Aluminum oxide ($Al_2O_3$) powder and the above-mentioned silicate glass powder containing barium underwent dry blending in a weight ratio of $Al_2O_3$:silicate glass powder of 10:90 to obtain mixed powder. Water of 100 parts by weight is added to the mixed powder of 100 parts by weight. Then, the water and mixed powder underwent wet blending to thereby prepare first slurry.

The other conditions for manufacturing the cylindrical metallic member and the exhaust gas processing device are similar to those in Example 10.

The thickness of the mixed layer formed on the inner surface of the cylindrical metallic member of Example 14 was 50 μm, and the thickness of the glass layer was 25 μm.

Example 15

In a similar manner to Example 10, a cylindrical metallic member of Example 15 and an exhaust gas processing device of Example 15 were manufactured. With Example 15, first slurry is prepared as follows.

Manganese oxide ($MnO_2$) powder and the above-mentioned silicate glass powder containing barium underwent dry blending in a weight ratio of $MnO_2$:silicate glass powder of 15:85 to obtain mixed powder. Water of 100 parts by weight is added to the mixed powder of 100 parts by weight. Then, the water and mixed powder underwent dry blending to thereby prepare a first slurry.

The other conditions for manufacturing the cylindrical metallic member and the exhaust gas processing device are similar to those in Example 10.

The thickness of the mixed layer formed on the inner surface of the cylindrical metallic member of Example 15 was 50 μm, and the thickness of the glass layer was 25 μm.

Comparative Example 5

In a similar manner to Example 10, a cylindrical metallic member of Comparative Example 5 and an exhaust gas processing device of Comparative Example 5 were manufactured. However, in Comparative Example 5, the thickness of the mixed layer formed on the inner surface of the cylindrical metallic member was 300 μm and the thickness of the glass layer is 300 μm.

The other conditions for manufacturing the cylindrical metallic member and the exhaust gas processing device are similar to those in Example 10.

Comparative Example 6

In a similar manner to Example 10, a cylindrical metallic member of Comparative Example 6 and an exhaust gas processing device of Comparative Example 6 were manufactured. However, in Comparative Example 6, the thickness of the mixed layer formed on the inner surface of the cylindrical metallic member was 20 μm and the thickness of the glass layer is 5 μm. The other conditions for manufacturing the cylindrical metallic member and the exhaust gas processing device are similar to those in Example 10.

Comparative Example 7

In a similar manner to Example 10, a cylindrical metallic member of Comparative Example 7 and an exhaust gas processing device of Comparative Example 7 were manufactured. However, in Comparative Example 7, the thickness of the mixed layer formed on the inner surface of the cylindrical metallic member was 10 μm and the thickness of the glass layer is 10 μm. The other conditions for manufacturing the cylindrical metallic member and the exhaust gas processing device are similar to those in Example 10.

In Tables 1 and 2, the composition of the insulating layer, the film thickness (a thickness of the insulating layer) and so on of the cylindrical metallic member according to Examples 1-15 and Comparative Examples 1-7 are listed.

TABLE 1

| | | INSULATING LAYER | | | EVALUATION RESULT | |
| --- | --- | --- | --- | --- | --- | --- |
| | | | THICKNESS OF FIRST LAYER | THICKNESS OF SECOND LAYER | | MEASURED RESISTANCE |
| | STRUCTURE | COMPOSITION (wt %) | (μm) | (μm) | ADHESION | (Ω) |
| EXAMPLE 1 | GLASS LAYER (SINGLE LAYER) | SILICATE GLASS CONTAINING BARIUM | 30 | — | GOOD | $5.0 \times 10^8$ |
| EXAMPLE 2 | GLASS LAYER (SINGLE LAYER) | SILICATE GLASS CONTAINING BARIUM | 20 | — | GOOD | $3.0 \times 10^8$ |
| EXAMPLE 3 | GLASS LAYER (SINGLE LAYER) | SILICATE GLASS CONTAINING BARIUM | 80 | — | GOOD | $1.0 \times 10^9$ |
| EXAMPLE 4 | GLASS LAYER (SINGLE LAYER) | SILICATE GLASS CONTAINING BARIUM | 400 | — | GOOD | $7.0 \times 10^9$ |
| COMPARATIVE EXAMPLE 1 | GLASS LAYER (SINGLE LAYER) | SILICATE GLASS CONTAINING BARIUM | 8 | — | GOOD | $4.0 \times 10^4$ OR LESS |
| COMPARATIVE EXAMPLE 2 | GLASS LAYER (SINGLE LAYER) | SILICATE GLASS CONTAINING BARIUM | 600 | — | PEEL-OFF | $1.0 \times 10^{10}$ |
| EXAMPLE 5 | MIXED LAYER (SINGLE LAYER) | $MnO_2$:FeO:CuO:AMORPHOUS BINDER (30:5:5:60) | 50 | — | GOOD | $9.0 \times 10^5$ |

TABLE 1-continued

| | INSULATING LAYER | | THICKNESS OF FIRST LAYER (μm) | THICKNESS OF SECOND LAYER (μm) | EVALUATION RESULT | |
|---|---|---|---|---|---|---|
| | STRUCTURE | COMPOSITION (wt %) | | | ADHESION | MEASURED RESISTANCE (Ω) |
| EXAMPLE 6 | MIXED LAYER (SINGLE LAYER) | $MnO_2$:FeO:CuO:AMORPHOUS BINDER (30:5:5:60) | 100 | — | GOOD | $2.0 \times 10^5$ |
| EXAMPLE 7 | MIXED LAYER (SINGLE LAYER) | $MnO_2$:FeO:CuO:AMORPHOUS BINDER (30:5:5:60) | 400 | — | GOOD | $7.0 \times 10^6$ |
| EXAMPLE 8 | MIXED LAYER (SINGLE LAYER) | $Al_2O_3$:AMORPHOUS BINDER (10:90) | 100 | — | GOOD | $2.0 \times 10^{10}$ |
| EXAMPLE 9 | MIXED LAYER (SINGLE LAYER) | $MnO_2$:AMORPHOUS BINDER (15:85) | 100 | — | GOOD | $2.0 \times 10^8$ |
| COMPARATIVE EXAMPLE 3 | MIXED LAYER (SINGLE LAYER) | $MnO_2$:FeO:CuO:AMORPHOUS BINDER (30:5:5:60) | 600 | — | PEEL-OFF | $1.0 \times 10^7$ |
| COMPARATIVE EXAMPLE 4 | MIXED LAYER (SINGLE LAYER) | $MnO_2$:FeO:CuO:AMORPHOUS BINDER (30:5:5:60) | 20 | — | GOOD | $4.0 \times 10^4$ OR LESS |

TABLE 2

| | INSULATING LAYER | | THICKNESS OF FIRST LAYER (μm) | THICKNESS OF SECOND LAYER (μm) | EVALUATION RESULT | |
|---|---|---|---|---|---|---|
| | STRUCTURE | COMPOSITION (wt %) | | | ADHESION | MEASURED RESISTANCE (Ω) |
| EXAMPLE 10 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 5 | 20 | GOOD | $3.0 \times 10^8$ |
| EXAMPLE 11 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 50 | 5 | GOOD | $8.0 \times 10^7$ |
| EXAMPLE 12 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 200 | 200 | GOOD | $3.0 \times 10^9$ |
| EXAMPLE 13 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 50 | 25 | GOOD | $4.0 \times 10^8$ |
| EXAMPLE 14 | MIXED LAYER (FIRST LAYER) + GLASS LAYER (SECOND LAYER) | FIRST LAYER: $Al_2O_3$:AMORPHOUS BINDER (10:90) SECOND LAYER: SILICATE GLASS CONTAINING BARIUM | 50 | 25 | GOOD | $9.0 \times 10^9$ |
| EXAMPLE 15 | MIXED LAYER (FIRST LAYER) + GLASS LAYER (SECOND LAYER) | FIRST LAYER: $MnO_2$:AMORPHOUS BINDER (15:85) SECOND LAYER: SILICATE GLASS CONTAINING BARIUM | 50 | 25 | GOOD | $5.0 \times 10^8$ |
| COMPARATIVE EXAMPLE 5 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 300 | 300 | PEEL-OFF | $5.0 \times 10^9$ |
| COMPARATIVE EXAMPLE 6 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 20 | 5 | GOOD | $4.0 \times 10^4$ OR LESS |
| COMPARATIVE EXAMPLE 7 | MIXED LAYER (FIRST LAYER) + GLASS LAYER (SECOND LAYER) | FIRST LAYER: $MnO_2$:FeO:CuO:AMORPHOUS BINDER (30:5:5:60) SECOND LAYER: SILICATE GLASS CONTAINING BARIUM | 10 | 10 | GOOD | $4.0 \times 10^4$ OR LESS |

(Evaluation of Adhesion)

Evaluation tests of adhesion of the insulating layers were carried out using the cylindrical metallic members of Examples 1-15 and Comparative Examples 1-7. As the method for the evaluation test, the following heat shock test is adopted.

The cylindrical metallic members were heated to be 850° C. The cylindrical metallic members which were heated were thrown into water having a temperature of 25° C. Thereafter, the cylindrical metallic members were retrieved to visually observe peel-off of the insulating layers.

The evaluation results of adhesion are indicated in the column of "ADHESION" of "EVALUATION RESULT" of Table 1 and Table 2. With results of these adhesion tests, it is known that the insulating layers of Examples 1-15 did not undergo peel-off. On the other hand, the insulating layers of the cylindrical metallic members of Comparative Examples 2, 3 and 5 underwent peel-off.

(Measured Resistance)

Next, the exhaust gas processing devices of Examples 1-15 and Comparative Examples 1-7 were used to measure values of resistance (volume resistances) of the exhaust gas processing devices. The resistances were measured by a resistance measurement instrument (a digital ultrahigh resistance and microammeter, type: R8340, manufactured by ADVANTEST CORPORATION). Specifically, the measurement is carried out as follows.

Before the measurement, distilled water having an electric resistivity of 0.1 to 1.0 MΩ·cm at a temperature of 25° C. was poured into the inorganic mat members of the exhaust gas processing device. The electric resistivity of the distilled water was measured by an electric resistivity instrument of model 7727-A100 manufactured by TECHNO-MORIOKA. The inorganic mat member sufficiently absorbed water so as to drip the water from the inorganic mat member.

Under the state, a resistance measuring instrument was connected between the pair of the probe electrodes. A voltage of 500 V was applied between the probe electrodes 940A and 940B and a resistance value between the probe electrodes 940A and 940B was measured after ten minutes.

In the above measurements, the resistance value of the insulating layer was not measured and the resistance value between the inorganic mat member impregnated with distilled water and the cylindrical metallic member was measured. With Examples 1 to 15 and Comparative Examples 1 to 7, the resistance values of the inorganic mat members impregnated with the distilled water and the cylindrical metallic member are extremely low (e.g., $1/10^{18}$ to $1/10^6$ times) in comparison with the resistance value of the insulating layer. Therefore, the resistance values of the inorganic mat members and the cylindrical metallic member do not substantially affect the resistance value of the insulating layer. If the resistance value between the inorganic mat member and the cylindrical metallic member is measured, the resistance value of the insulating layer is substantially obtainable.

The evaluation results of measured resistances are indicated in the column of "MEASURED RESISTANCE" of "EVALUATION RESULT" of Table 1 and Table 2.

Referring to the evaluation results of the measured resistances, the measured resistances of Comparative Example 1, Comparative Example 4, Comparative Example 6 and Comparative Example 7 were $4.0 \times 10^4 \Omega$ or less. On the other hand, the measured resistances of Examples 1 to 15 were at least $9.0 \times 10^5 \Omega$ or more. The resistance values of the exhaust gas processing devices of Examples 1 to 15 were larger than the resistance values of the exhaust gas processing devices of Comparative Examples 1, 4, 6 and 7 by at least 20 times. Thus, the good insulation properties of Examples 1 to 15 are obtained.

As described, it was confirmed that the exhaust gas processing devices of the embodiments of the present invention have good insulation properties between their honeycomb structures and their cylindrical metallic members.

According to the embodiments of the present invention, it is possible to provide the exhaust gas processing devices which can prevent electric currents from leaking into components other than the honeycomb structures.

Obviously, numerous modifications and variations of the present invention are possible in light of the above teachings. It is therefore to be understood that within the scope of the appended claims, the invention may be practiced otherwise than as specifically described herein.

What is claimed is:

1. An exhaust gas processing device comprising:
   a honeycomb structure in a pillar shape including a honeycomb unit, the honeycomb unit including cell walls extending along a longitudinal direction of the honeycomb unit to define a plurality of cells which extend from a first end of the honeycomb unit to a second end of the honeycomb unit along the longitudinal direction;
   a catalytic agent provided on the cell walls;
   an inorganic mat member wound around an outer peripheral surface of the honeycomb structure;
   a cylindrical metallic member accommodating the honeycomb structure around which the inorganic mat member is wound; and
   an insulating layer having a thickness of about 20 μm to about 400 μm and densely formed such that no through pores exist in a thickness direction of the insulating layer, the insulating layer being provided between an inner surface of the cylindrical metallic member and the inorganic mat member, and electrically insulating between the honeycomb structure and the cylindrical metallic member.

2. The exhaust gas processing device according to claim 1, wherein the insulating layer includes a glass layer.

3. The exhaust gas processing device according to claim 2, wherein the glass layer includes barium glass, boron glass, strontium glass, alumina silicate glass, soda-zinc glass, or soda-barium glass.

4. The exhaust gas processing device according to claim 2, wherein the glass layer has a melting point of about 400° C. to about 1000° C.

5. The exhaust gas processing device according to claim 1, wherein the insulating layer includes a mixed layer which includes an amorphous binder and a crystalline metal oxide, and
   the mixed layer has a thickness in a range of about 50 μm to about 400 μm.

6. The exhaust gas processing device according to claim 5, wherein the amorphous inorganic member includes barium glass, boron glass, strontium glass, alumina silicate glass, soda-zinc glass, or soda-barium glass.

7. The exhaust gas processing device according to claim 5, wherein the crystalline metal oxide includes iron oxide, cobalt oxide, copper oxide, manganese oxide, chrome oxide, aluminum oxide or a combination thereof.

8. The exhaust gas processing device according to claim 1, wherein the inorganic mat member has a thickness of about 1 mm to about 20 mm in a state where the cylindrical metallic member accommodates the honeycomb structure around which the inorganic mat member is wound.

9. The exhaust gas processing device according to claim 1, wherein the honeycomb unit is made of silicon carbide.

10. The exhaust gas processing device according to claim 1,
wherein a number of the honeycomb units included in the honeycomb structure is one.

11. The exhaust gas processing device according to claim 1,
wherein the honeycomb structure is formed by connecting a plurality of honeycomb units by interposing adhesive layers.

12. The exhaust gas processing device according to claim 11,
wherein the honeycomb structure includes four honeycomb units, each being shaped substantially like a fan-pillar, the four honeycomb units being arranged so that outer peripheral flat surfaces of the four honeycomb units face each other and being joined each other using adhesive layers.

13. The exhaust gas processing device according to claim 1,
wherein the cylindrical metallic member is made of stainless steel or a nickel base alloy.

14. The exhaust gas processing device according to claim 1,
wherein the honeycomb unit includes a small amount of a resistance adjusting component.

15. The exhaust gas processing device according to claim 14,
wherein the resistance adjusting component includes aluminum nitride.

16. The exhaust gas processing device according to claim 1,
wherein the honeycomb structure has electrodes on an outer peripheral surface of the honeycomb structure.

17. The exhaust gas processing device according to claim 16,
wherein the honeycomb structure has a first end portion at one end of the longitudinal direction of the honeycomb structure and a second end portion at another end of the longitudinal direction of the honeycomb structure, and the electrodes surround the first end portion, a vicinity of the first end portion, the second end portion and a vicinity of the second end portion.

18. The exhaust gas processing device according to claim 16,
wherein the electrodes are made of a metal.

19. The exhaust gas processing device according to claim 1,
wherein when electricity is applied to the honeycomb structure, a resistance between the honeycomb structure and the cylindrical metallic member is about $1 \times 10^5 \Omega$ or more.

20. The exhaust gas processing device according to claim 1,
wherein the catalytic agent is platinum, rhodium, or palladium.

21. The exhaust gas processing device according to claim 1,
wherein the inorganic mat member has a density in a range of about 0.05 g/cm$^3$ to about 0.5 g/cm$^3$ in a state where the inorganic mat member is accommodated in the cylindrical metallic member.

22. The exhaust gas processing device according to claim 1,
wherein the insulating layer consists of a dense glass layer.

23. The exhaust gas processing device according to claim 1,
wherein the insulating layer includes a dense mixed layer which includes an amorphous binder and a crystalline metal oxide.

24. An exhaust gas processing device comprising:
a honeycomb structure in a pillar shape including a honeycomb unit, the honeycomb unit including cell walls extending along a longitudinal direction of the honeycomb unit to define a plurality of cells which extend from a first end of the honeycomb unit to a second end of the honeycomb unit along the longitudinal direction;
a catalytic agent provided on the cell walls;
an inorganic mat member wound around an outer peripheral surface of the honeycomb structure;
a cylindrical metallic member accommodating the honeycomb structure around which the inorganic mat member is wound; and
an insulating layer having a thickness of about 20 μm to about 400 μm and densely formed, the insulating layer being provided between an inner surface of the cylindrical metallic member and the inorganic mat member,
wherein the insulating layer includes a glass layer and a mixed layer which includes an amorphous binder and a crystalline metal oxide and which is formed between the inner surface of the cylindrical metallic member and the glass layer, and
wherein the glass layer has a thickness of about 20 μm or more, the mixed layer has a thickness of about 50 μm or more, or the glass layer has a thickness of about 20 μm or more and the mixed layer has a thickness of about 50 μm or more.

25. The exhaust gas processing device according to claim 24,
wherein the mixed layer has a coefficient of thermal expansion in a range between a coefficient of thermal expansion of the cylindrical metallic member and a coefficient of thermal expansion of the glass layer.

26. The exhaust gas processing device according to claim 24,
wherein the mixed layer has a coefficient of thermal expansion in a range between about $0.6 \times 10^{-6}/°$ C. and about $17 \times 10^{-6}/°$ C.

27. An exhaust gas processing device comprising:
a honeycomb structure in a pillar shape including a honeycomb unit, the honeycomb unit including cell walls extending along a longitudinal direction of the honeycomb unit to define a plurality of cells which extend from a first end of the honeycomb unit to a second end of the honeycomb unit along the longitudinal direction;
a catalytic agent provided on the cell walls;
an inorganic mat member wound around an outer peripheral surface of the honeycomb structure;
a cylindrical metallic member accommodating the honeycomb structure around which the inorganic mat member is wound; and
an insulating layer having a thickness of about 20 μm to about 400 μm and densely formed, the insulating layer being provided between an inner surface of the cylindrical metallic member and the inorganic mat member, and electrically insulating between the honeycomb structure and the cylindrical metallic member,
wherein the exhaust gas processing device includes a pair of electric terminals, each of the pair of electric terminals penetrates the inorganic mat member and is connected to electrodes provided in the honeycomb structure, and each of the pair of electrode terminals is insulated from the cylindrical metallic member with insulators.

28. An exhaust gas processing device comprising:

a honeycomb structure in a pillar shape including a honeycomb unit, the honeycomb unit including cell walls extending along a longitudinal direction of the honeycomb unit to define a plurality of cells which extend from a first end of the honeycomb unit to a second end of the honeycomb unit along the longitudinal direction;

a catalytic agent provided on the cell walls;

an inorganic mat member wound around an outer peripheral surface of the honeycomb structure;

a cylindrical metallic member accommodating the honeycomb structure around which the inorganic mat member is wound; and an insulating layer having a thickness of about 20 μm to about 400 μm and densely formed, the insulating layer being provided between an inner surface of the cylindrical metallic member and the inorganic mat member, and electrically insulating between the honeycomb structure and the cylindrical metallic member, wherein the insulating layer includes a glass layer and a mixed layer which includes an amorphous binder and a crystalline metal oxide and which is formed between the inner surface of the cylindrical metallic member and the glass layer.

* * * * *